United States Patent
Tomita et al.

(10) Patent No.: US 6,411,774 B1
(45) Date of Patent: Jun. 25, 2002

(54) APPARATUS AND METHOD OF REPRODUCING AUDIO/VIDEO SIGNAL FROM RECORDING MEDIUM WITH REDUCED OR ELIMINATED INITIAL DELAY

(75) Inventors: Masami Tomita, Chiba; Takao Takahashi; Masashi Ohta, both of Tokyo; Toshiya Akiba; Taro Suito, both of Kanagawa; Toshimichi Hamada, Tokyo; Katsunari Miyata, Tokyo; Koichi Chotoku, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/162,379

(22) Filed: Sep. 28, 1998

(30) Foreign Application Priority Data

Sep. 30, 1997 (JP) .............................................. 9-267484

(51) Int. Cl.[7] .............................................. H04S 5/781
(52) U.S. Cl. ......................................... 386/125; 386/46
(58) Field of Search .............................. 386/46, 68, 70, 386/69, 82, 109, 111–112, 125–126, 96, 1, 33, 45, 40, 39, 98; 369/48, 47, 32, 53.37, 47.32, 47.33, 47.34; 348/419.1

(56) References Cited

U.S. PATENT DOCUMENTS

| | | | | |
|---|---|---|---|---|
| 5,463,607 A | * | 10/1995 | Roth et al. ..................... | 369/48 |
| 5,587,978 A | * | 12/1996 | Endo et al. .................... | 369/48 |
| 5,627,809 A | * | 5/1997 | Honjo ......................... | 386/111 |
| 5,642,417 A | * | 6/1997 | Stringer ....................... | 380/49 |
| 5,671,204 A | * | 9/1997 | Yokouchi et al. ............. | 369/48 |
| 5,748,585 A | * | 5/1998 | Tsukamoto et al. ....... | 369/47.23 |
| 5,844,867 A | * | 12/1998 | DeHaan et al. ............. | 386/109 |
| 5,912,867 A | * | 6/1999 | Miyazono ................. | 369/44.27 |
| 6,081,651 A | * | 6/2000 | Kim ........................... | 386/111 |

* cited by examiner

Primary Examiner—Vincent Boccio
(74) Attorney, Agent, or Firm—Frommer Lawrence & Haug LLP; William S. Frommer; Glenn F. Savit (57) ABSTRACT

A signal reproducing apparatus is disclosed with which time is not required from a moment at which a user has started a reproducing operation to a moment at which the user is able to actually confirm required information. An audio-and-video-signal reproducing apparatus incorporates a head for recording an audio and video signal recorded on a recording medium; a RAM on which the audio and video signal read by the head is temporarily stored; and a control circuit having a control function for controlling the head to read the audio and video signal recorded on the recording medium and controlling writing of the audio and video signal temporarily stored in the RAM.

15 Claims, 4 Drawing Sheets

APPARATUS AND METHOD OF REPRODUCING AUDIO/VIDEO SIGNAL FROM RECORDING MEDIUM WITH REDUCED OR ELIMINATED INITIAL DELAY

BACKGROUND OF THE INVENTION

1. Field of the Invention

The present invention relates to an apparatus and a method of reproducing an audio and video signal recorded on a recording medium and an apparatus for recording an audio and video signal on a recording medium and reproducing an audio and video signal from the same.

2. Related Background Art

Hitherto, a signal reproducing apparatus has been structured such that when a user or the like has operated to start a reproducing operation of the signal reproducing apparatus, an audio and video signal recorded on a disk or the like is read by a drive unit.

Specifically, when the signal reproducing apparatus has been operated to start the reproducing operation, a disk table on which a disk has been loaded is rotated. Then, a head portion provided for the inside portion of the drive unit is moved to a required position of the disk.

Since the operation for moving the head portion and the operation for rotating the disk are performed by mechanical systems, a somewhat long time is required from a request to reproduce an audio and video signal to reading the audio and video signal from the disk. For example, when the number of revolutions of the disk has reached a predetermined number of revolutions, data can be written on the disk or data can be read from the same.

Therefore, a long time is required from the operation performed by a user to reproduce an audio and video signal to actual output of required information. Thus, the user must wait for the output for the required time.

SUMMARY OF THE INVENTION

In view of the foregoing, an object of the present invention is to provide a signal reproducing apparatus which does not require time from a moment at which a user has started a reproducing operation to a moment at which the user is able to actually confirm required information, a method therefor, a signal recording and reproducing apparatus and a method therefor.

To achieve the above-mentioned object, according to one aspect of the present invention, there is provided a signal reproducing apparatus comprising: storage means for temporarily storing the audio and video signal read by signal reading means; and control means for controlling the signal reading means to read the audio and video signal recorded on the recording medium and controlling writing of the audio and video signal which is temporarily stored in the storage means, wherein the control means causes the signal reading means to read the audio and video signal from the recording medium in a state before a reproducing operation is started so as to write the audio and video signal on the storage means.

As a result, the signal reproducing apparatus previously reads the audio and video signal recorded on the recording medium before the reproducing operation is started. After the reproducing operation has been started, the audio and video signal read and stored in the storage means is transmitted.

To achieve the above-mentioned object, according to another aspect of the present invention, there is provided a signal reproducing method comprising the step of previously writing an audio and video signal read from a recording medium on a storage means in a state before a reproducing operation is started.

As a result, the signal reproducing method has the structure that the audio and video signal recorded on the recording medium is previously read and stored in the storage means. After the reproducing operation has been started, the audio and video signal read and stored in the storage means is transmitted.

To achieve the above-mentioned object, according to another aspect of the present invention, there is provided a signal recording and reproducing apparatus comprising: additional-information writing means for writing, on a recording medium on which the audio and video signal is written by signal writing means, additional information relating to the audio and video signal which is written on the recording medium; storage means for temporarily storing the audio and video signal read by signal reading means; and control means for controlling the signal reading means to read the audio and video signal recorded on the recording medium and controlling writing of the audio and video signal which is temporarily stored in the storage means, wherein the control means causes the signal reading means to previously read the audio and video signal from the recording medium and write the read audio and video signal on the storage means in accordance with additional information recorded on the recording medium in a state before a reproducing operation is started.

As a result, the signal recording and reproducing apparatus previously reads the audio and video signal recorded on the recording medium to store the audio and video signal in the storage means before the reproducing operation is started in accordance with additional information recorded on the recording medium. Immediately after the reproducing operation has been started, the audio and video signal read and stored in the storage means is transmitted.

According to another aspect of the present invention, there is provided a signal recording and reproducing method of recording an audio and video signal on a recording medium and reproducing an audio and video signal from the same, the signal recording and reproducing method comprising: an additional-information writing step for writing, on the recording medium on which the audio and video signal is written, additional information relating to the audio and video signal which is written on the recording medium; and a storage step for temporarily storing, in storage means, the audio and video signal previously read from the recording medium in a state before a reproducing operation is started in accordance with additional information written on the recording medium in the writing step.

As a result, the signal recording and reproducing method has the structure that the audio and video signal recorded on the recording medium is previously read and stored in the storage means before the reproducing operation is started in accordance with additional information recorded on the recording medium. Immediately after the reproducing operation has been started, the audio and video signal read and stored in the storage means is transmitted.

Other objects, features and advantages of the invention will be evident from the following detailed description of the preferred embodiments described in conjunction with the attached drawings.

DESCRIPTION OF THE PREFERRED EMBODIMENTS

An embodiment of the present invention will now be described with reference to the drawings. Initially, an audio and video signal reproducing apparatus will be described, after which an audio and video signal recording and reproducing apparatus will be described.

The audio-and-video-signal reproducing apparatus is a signal reproducing apparatus for reproducing an audio and video signal recorded on a recording medium. The recording medium from which the audio and video signal is reproduced by the audio-and-video-signal reproducing apparatus is, for example, a disk.

Figure 1:
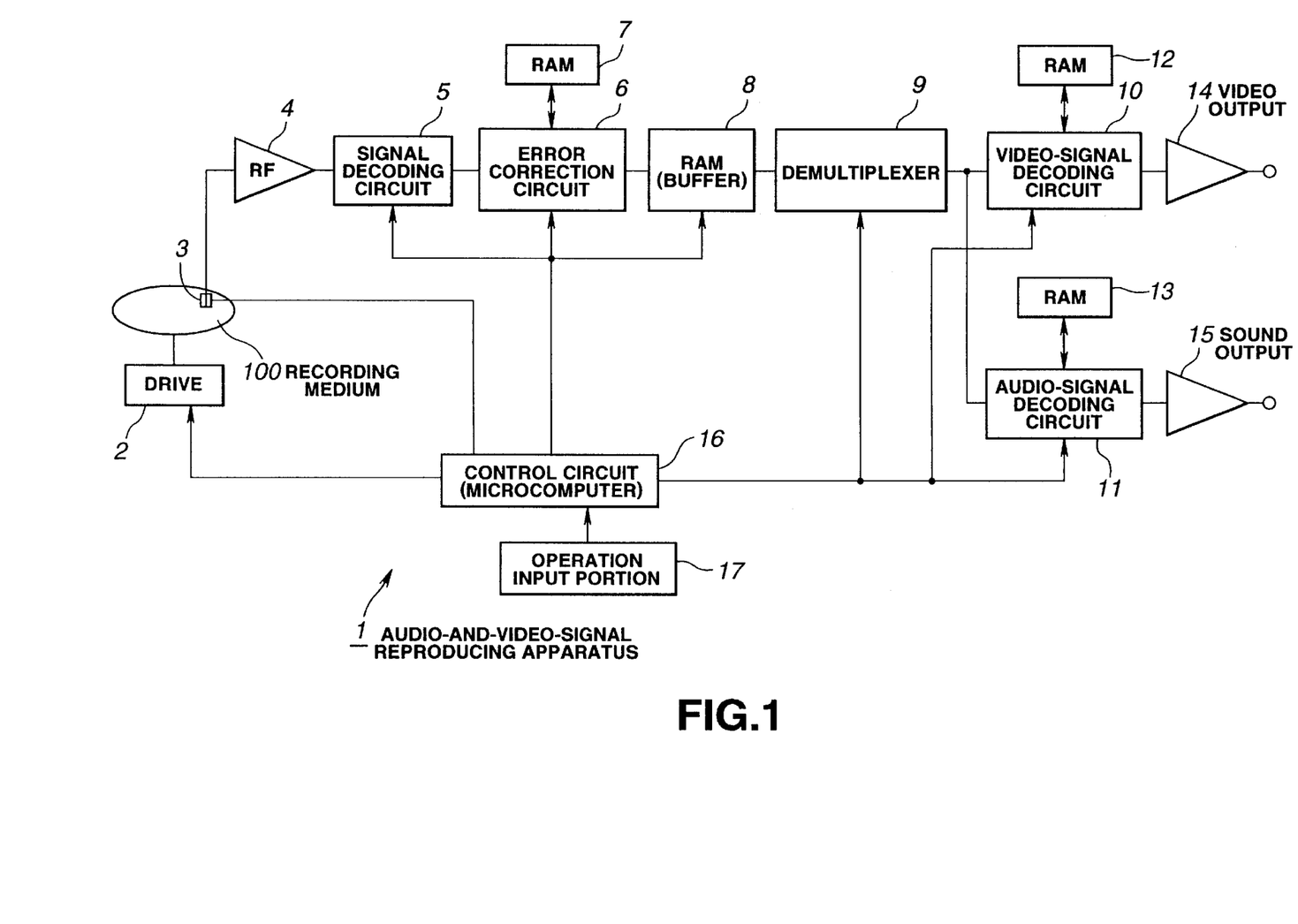
FIG. 1 is a block diagram showing circuits for use in an audio-and-video-signal reproducing apparatus according to an embodiment of the present invention.

As shown in FIG. 1, the audio-and-video-signal reproducing apparatus incorporates a head portion 3 which is a signal reading means for reading an audio and video signal recorded on a recording medium 100 which is a disk or the like; a RAM 8 which is a storage means for temporarily storing an audio and video signal read by the head portion 3; and a control circuit 16 having a control function for controlling the head portion 3 to read the audio and video signal recorded on the recording medium 100 and controlling a writing operation of the audio and video signal temporarily stored in the RAM 8.

Moreover, the audio-and-video-signal reproducing apparatus incorporates a drive 2 for rotating the recording medium 100; an RF amplifier 4 for amplifying the audio and video signal read by the head portion 3; a signal decoding circuit 5 for decoding the audio and video signal amplified by the RF amplifier 4; an error correction circuit 6 for detecting an error in data decoded by the signal decoding circuit 5; a RAM 7 which is a working region for the error correction circuit 6; the RAM 8 for temporarily storing the audio and video signal transmitted from the error correction circuit 6; a demultiplexer 9 for extracting, from the audio and video signal transmitted from the RAM 8, a video signal to assign the video signal to the following video-signal decoding circuit 10 and an audio signal to assign the audio signal to the following audio-signal decoding circuit 11; the video-signal decoding circuit 10 for subjecting the video signal assigned and transmitted from the demultiplexer 9 to a compression process or the like; a RAM 12 for use to temporarily store data for the video-signal decoding circuit 10 and to serve as a working region for the video-signal decoding circuit 10; the audio-signal decoding circuit 11 for subjecting the audio signal assigned and transmitted from the demultiplexer 9 to a compression process or the like; a RAM 13 for use to temporarily store data for the audio-signal decoding circuit 11 and to serve as a working region for the audio-signal decoding circuit 11; a video output portion 14 for amplifying the video signal subjected to the compression process or the like to an amplifying process so as to transmit the amplified signal; a sound output portion 15 for subjecting the audio signal subjected to the compression process or the like in the audio-signal decoding circuit 11 so as to transmit the audio signal; a control circuit 16 for controlling the above-mentioned circuits; and an operation input portion 17 arranged to be operated by a user or the like.

In the audio-and-video-signal reproducing apparatus 1 having the above-mentioned structure, the head portion 3 reads the audio and video signal from the recording medium 100, which is rotated by the drive 2, so as to transmit the audio and video signal to the RF amplifier 4.

The RF amplifier 4 amplifies the read audio and video signal. The audio and video signal amplified by the RF amplifier 4 is supplied to the signal decoding circuit 5.

The signal decoding circuit 5 expands and decodes the supplied audio and video signal. The operation of the signal decoding circuit 5 is controlled by the control circuit 16. The expanded and decoded audio and video signal is supplied to the error correction circuit 6.

The error correction circuit 6 detects an error included in the supplied audio and video signal so as to correct the error. The error correction circuit 6 uses the RAM 7 as the working region to correct the error of supplied data. The operation of the error correction circuit 6 is controlled by the control circuit 16. The audio and video signal, the error of which has been corrected by the error correction circuit 6, is supplied to the RAM 8.

The RAM 8 is a storage means on which data is temporarily written before data is transmitted to the downstream processing system. The output of data from the RAM 8 to the downstream circuit is controlled by the control circuit 16. In a state before the reproducing operation is started, the control circuit 16 has a write control function for writing, on the RAM 8, the audio and video signal previously read (i.e., pre-stored) from the recording medium 100.

When a reproducing operation is performed or when an operation for starting the reproducing operation has been performed, data written on the RAM 8 is transmitted from the RAM 8 and supplied to the demultiplexer 9.

The demultiplexer 9 assigns and transmits the supplied audio and video signal to the downstream circuit. Since the audio and video signal is assigned by the demultiplexer 9, the video signal is supplied to the video-signal decoding circuit 10 and the audio signal is supplied to the audio-signal decoding circuit 11.

The video-signal decoding circuit 10 uses the RAM 12 as the working region so as to decode the supplied video signal. The decoded video signal is supplied to the video output portion 14. The video output portion 14 amplifies the supplied video signal, and then transmits the video signal to, for example, an external apparatus.

The audio-signal decoding circuit 11 uses the RAM 13 as the working region so as to decode the supplied audio signal. The decoded audio signal is supplied to the sound output portion 15. The sound output portion 15 amplifies the supplied video signal, and then transmits the audio signal to, for example, an external apparatus.

The operation of the above-mentioned audio-and-video-signal reproducing apparatus will now be described which must be performed in a state, such as a stop state, in which the reproducing operation is not performed, until the reproducing operation is started.

In a standby state in which an audio and video signal can be read from the recording medium 100, for example, in a state, such as a stop state except for the reproducing mode, the audio-and-video-signal reproducing apparatus 1 reads an audio and video signal from the recording medium 100. Then, the audio-and-video-signal reproducing apparatus 1 records the read audio and video signal to store the same in the RAM 8.

The quantity of data which must be stored in the RAM 8 is a quantity corresponding to data which is transmitted from the RAM 8 in a period of time from a reproducing operation is performed in a stop state to a moment at which data is newly written on the RAM 8 from the recording medium 100. Data which is written on the RAM 8 at this time is assumed to be an audio and video signal which is expected to be reproduced next.

When the standby state is brought to the reproducing state, the audio-and-video-signal reproducing apparatus 1 transmits the audio and video signal stored in the RAM 8 to the downstream circuit. When, for example, a user operates the operation input portion 17, the reproducing operation is started.

When the state has been shifted, the audio and video signal is transmitted from the RAM 8 of the audio-and-video-signal reproducing apparatus 1. The audio and video signal is assigned by the demultiplexer 9 so that a video signal is transmitted through the video-signal decoding circuit 10 and an audio signal is transmitted through the audio-signal decoding circuit 11.

Simultaneously with the operation for transmitting the audio and video signal, the audio-and-video-signal reproducing apparatus 1 performs a process for reading, from the recording medium 100, the stored audio and video signal following the audio and video signal transmitted from the RAM 8 so as to supply the following audio and video signal to the RAM 8.

To read the following audio and video signal from the recording medium 100, the audio-and-video-signal reproducing apparatus 1 causes the drive 2 to rotate the recording medium 100 so as to move the head portion 3 to a track or a sector on which required data has been recorded.

As described above, data corresponding to a time delay is stored in the RAM 8, the time delay being a so-called delay in reproduction which takes place after the operation for starting the reproducing operation has been performed to rotate the recording medium 100 to a moment at which the audio and video signal on the recording medium 100 is actually written on the RAM 8. Data previously read and stored in the RAM 8 is the audio and video signal which is expected to be reproduced next.

Therefore, the audio-and-video-signal reproducing apparatus 1 is able to reproduce the audio and video signal previously stored (i.e., pre-stored) in the RAM 8 during an operation for reading data from the recording medium 100 because the reproducing operation has been started.

As a result, response speed of the audio-and-video-signal reproducing apparatus 1 immediately after the reproducing operation has been started can be raised. Thus, a user is able to immediately confirm a required audio and video signal after the user has started the reproducing operation.

The quantity of data of the audio and video signals which must previously be read and stored in the RAM 8 may be determined to correspond to a signal reproducing rate, for example, the highest rate. For example, also the capacity of the RAM 8 is determined to correspond to the quantity of data determined as described above. Since the capacity of the RAM 8 is determined as described above, an output of the audio and video signal which is read and supplied to the RAM 8 immediately after the reproducing operation has been started can be produced without delay to the audio and video signal which has been read and supplied to the RAM 8 before the reproducing operation is started.

Also, the time at which the operation for reproducing the audio and video signal previously stored in the RAM 8 may be determined to be adaptable to the capacity of the RAM 8. If the storage capacity of the RAM 8 is limited, reproduction of data stored in the RAM 8 is started after a predetermined time has elapsed. If the RAM 8 has not a data storage capacity with which data can be transmitted from the RAM 8 for a period of time required to make an access to a required data recording portion by the head portion 3 when the reproducing operation has been started, output of data from the RAM 8 is started after a predetermined time has elapsed from start of the operation for making the access.

The audio and video signal previously read from the recording medium 100 before the reproducing operation is started may previously be written on a storage means provided for another purpose, for example, the RAM 7 shown in FIG. 1. In this case, even if the capacity of the RAM 8 becomes insufficient, data which cannot be stored in the RAM 8 can be stored in the RAM 7.

The audio and video signal which is previously read and stored in the RAM 8 may be made to be the audio and video signal which is expected to be reproduced next, as described above. Moreover, the foregoing audio and video signal may be selected by the control circuit 16 in accordance with the following reference so as to be read and stored in the RAM 8 before the reproducing operation is performed.

For example, an audio and video signal recorded at the leading end of the recording medium 100 loaded into the audio-and-video-signal reproducing apparatus 1 may previously be read and stored in the RAM 8 before the reproducing operation is started. For example, when the recording medium 100 is changed to another recording medium 100 in a case where the audio-and-video-signal reproducing apparatus 1 is a changer type apparatus having a plurality of recording mediums or when a recording medium has been loaded into the audio-and-video-signal reproducing apparatus 1, the above-mentioned operation is performed.

When reproduction has been performed to a midpoint of the audio and video signal and then the operation has been interrupted, an audio and video signal following the audio and video signal reproduced to the midpoint may be written on the RAM 8.

A plurality of audio and video signals expected to be reproduced next may previously be read and stored in the RAM 8 in accordance with additional information recorded on the recording medium 100 before the reproducing operation is started. In the foregoing case, the plural audio and video signals which are read from the recording medium 100 so as to be stored in the RAM 8 may be determined to correspond to the quantity of data which is written on the RAM 8.

For example, a portion of the recording medium 100 has information, such as indexes. In accordance with the index or the like, an audio and video signal is previously read and stored into the RAM 8. Depending on the rate and the compression ratio of data in each portion or depending on the rate, the compression ratio and the number of channels if the number of the channels is different, data which must be read is appropriately distributed in the RAM 8. For example, a portion having a low rate is read and stored in the RAM 8 in a small quantity. A portion having a high rate is read and stored in the RAM 8 in a large quantity.

The quantity of data which must previously be read and stored in the RAM 8 is determined as follows.

If single type audio and video signals are read and stored, data in a quantity calculated by T×R is read and stored in the RAM 8 on an assumption that start time of a reproducing unit of the audio-and-video-signal reproducing apparatus 1 is T and a recording rate (quantity of information per unit time) of a reproduction stream is R.

If the storage capacity of the RAM 8 is physically limited, start of the reproducing operation of the unit is delayed by the time calculated by T−Q÷R on an assumption that the storage capacity of the RAM 8 is Q.

When a plurality of audio and video signals are read and stored in the RAM 8, data in the same quantity is read from reproducing points of the plurality of the audio and video signals. If the storage quantity of each of the reproducing point is too small, the calculation is performed similarly to that which is performed when the storage quantity of the RAM 8 is physically limited.

If the recording rate is different among the reproducing points, the audio and video signals are read in such a manner that the reproducing period of time at each reproducing point is the same. For example, data in twice the quantity is read from a point at which the recording rate is two times.

If a multiplicity of reproducing points exist, a portion of the reproducing points is read. The portion of the reproducing points means points having relatively great possibility that the points are reproduced. Specifically, reading of the following reproducing points is given priority:

a reproducing point at the leading end of the recording medium 100, a reproduced point following the reproducing point reproduced previously, a reproducing point which has not been reproduced, a reproducing point recorded finally and a reproducing point on the boundary between recorded contents.

The number of a portion of points is determined in accordance with the storage capacity of the RAM 8 and time required to reproduce the audio and video signal. Specifically, the total sum of the quantity of reading from the reproducing points is determined to correspond to the storage capacity Q by performing a calculation using the foregoing start time T and the recording rate. As an alternative to this, only shortening of the start time is performed to read a larger number of points.

Since the storage capacity of the RAM 8 and the conditions of data which must be stored in the RAM 8 are determined as described above, an audio and video signal which has a great possibility that it is reproduced can previously be read and stored in the RAM 8 when the reproducing operation has been started. Thus, reproduction response after the reproducing operation has been started can be improved.

Figure 2:
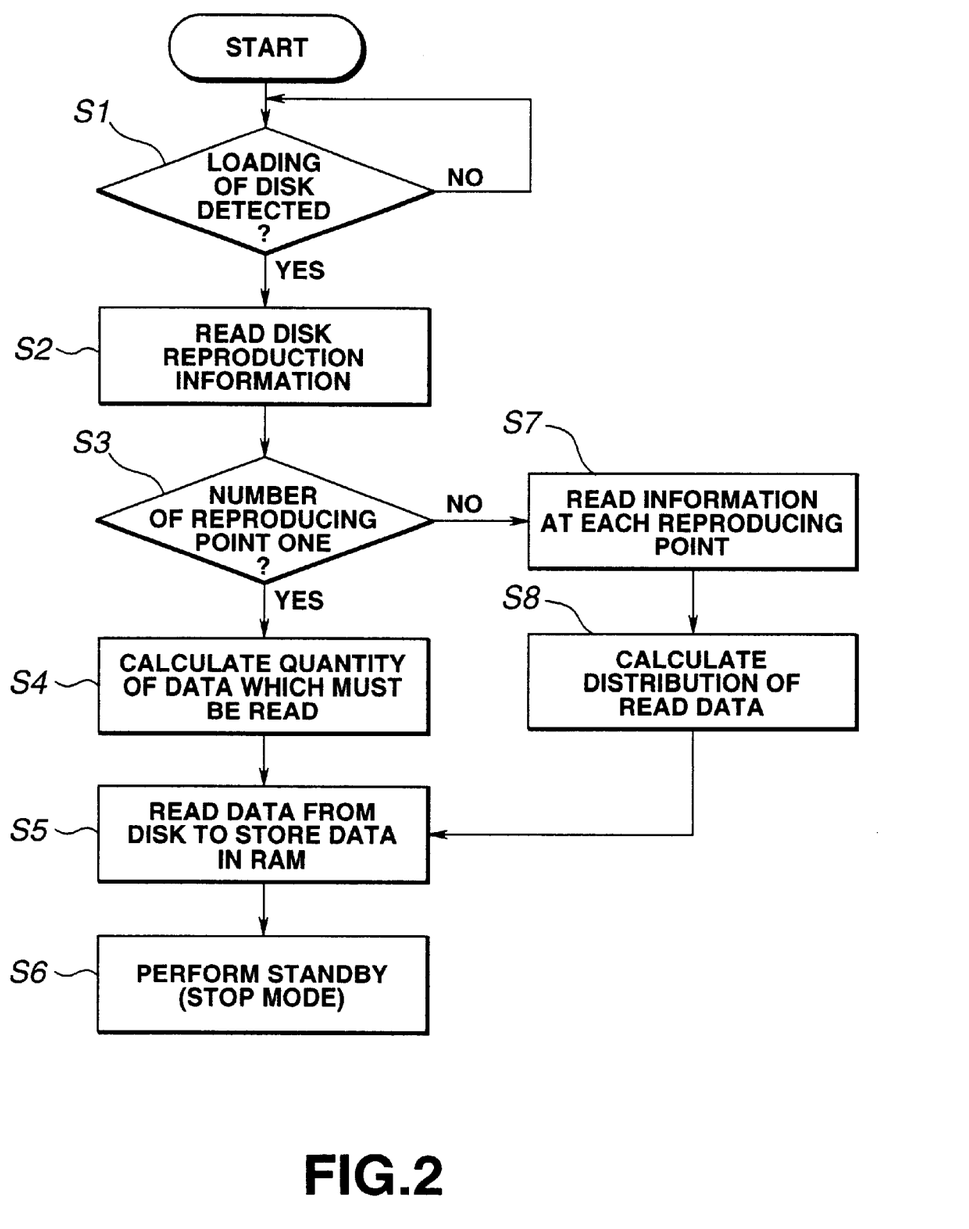
FIG. 2 is a flow chart of a process which is performed by the audio-and-video-signal reproducing apparatus before a reproducing operation is started.

FIG. 2 shows a flow chart of an operation which must be performed by the audio-and-video-signal reproducing apparatus 1 before the reproducing operation is started. The flow chart shows operations which are performed when a disk which is the recording medium 100 has been loaded into the audio-and-video-signal reproducing apparatus 1, when the disk has been loaded and then electric power has been supplied and when the reproducing state is shifted to a stop state.

Initially, the audio-and-video-signal reproducing apparatus 1 determines in step S1 whether or not the disk has been loaded. The audio-and-video-signal reproducing apparatus 1 continues the determining process in step S1 until an affirmative determination is made.

If the audio-and-video-signal reproducing apparatus 1 makes the affirmative determination that the disk has been loaded, the operation proceeds to step S2 so that reproduction information recorded on the disk and relating to the reproducing operation is read. Reproduction information relating to the reproducing operation is information for use to make a determination whether or not data must be read from the leading end of the disk, whether or not another reproducing operation must be performed such that a midpoint of the disk is performed in accordance with reproducing and recording hysteresis or whether or not an arbitrary region having an index or the like recorded thereon can selectively be reproduced by a user.

In step S3 following step S2, the audio-and-video-signal reproducing apparatus 1 determines whether or not the number of the reproducing point is one. If an affirmative determination is made that the number of the reproducing point is one, the audio-and-video-signal reproducing apparatus 1, in step S4, calculates the quantity of data which must be read in accordance with the recording rate.

The quantity of data which must be read is calculated in accordance with processing time required to rotate the disk when the mode is shifted to the reproducing mode and that required to perform an operation for decoding a reproduced image and so forth. If the required quantity of data which must be read is larger than the storage quantity of the storage means of the system including the RAM 8 which are in a state in which the storage means are able to store data, a reproducing period of time corresponding to the quantity of data which can be read is calculated. Thus, timing at which an output of data in the RAM 8 is produced when the reproducing operation is performed is calculated.

After the quantity of data which must be read has been calculated, data is read from the disk so as to be stored in the RAM 8 in step S5. In step S6 a standby mode is started until a reproducing operation is started.

If a negative determination is made in step S3 that the number of the reproducing point is not one, the operation of the audio-and-video-signal reproducing apparatus 1 proceeds to step S7. If the number of the reproducing point is not one, a determination is made that a plurality of reproducing points exist. Thus, a corresponding process is performed.

In step S7 the audio-and-video-signal reproducing apparatus 1 reads reproduction information of the plural reproducing points. In step S8 the audio-and-video-signal reproducing apparatus 1 performs calculations of the quantity of data and so forth similarly to the foregoing step in accordance with read reproduction information. In accordance with the calculated quantity of data, the distribution of data which must be read and stored in the RAM 8 is determined.

The distribution is determined in such a manner that the quantity of data which must be read is made to be different to make the reproducing period of time to be the same if the data rate is different. As an alternative to this, the reproducing points are weighted in accordance with reproduction information of the disk which has previously been read, and then data is read. Since data of the foregoing type is read, for example, data which has lately been recorded on the disk or data which has not been reproduced can be selected as data having great possibility that data is reproduced or as important data.

In accordance with a result of the calculation of the distribution of data which must be read and stored in the RAM 8, the audio-and-video-signal reproducing apparatus 1 reads data from the disk to store data into the RAM 8 in step S5. In step S6, the audio-and-video-signal reproducing apparatus 1 is brought to a standby mode until the reproducing operation is started.

Figure 3:
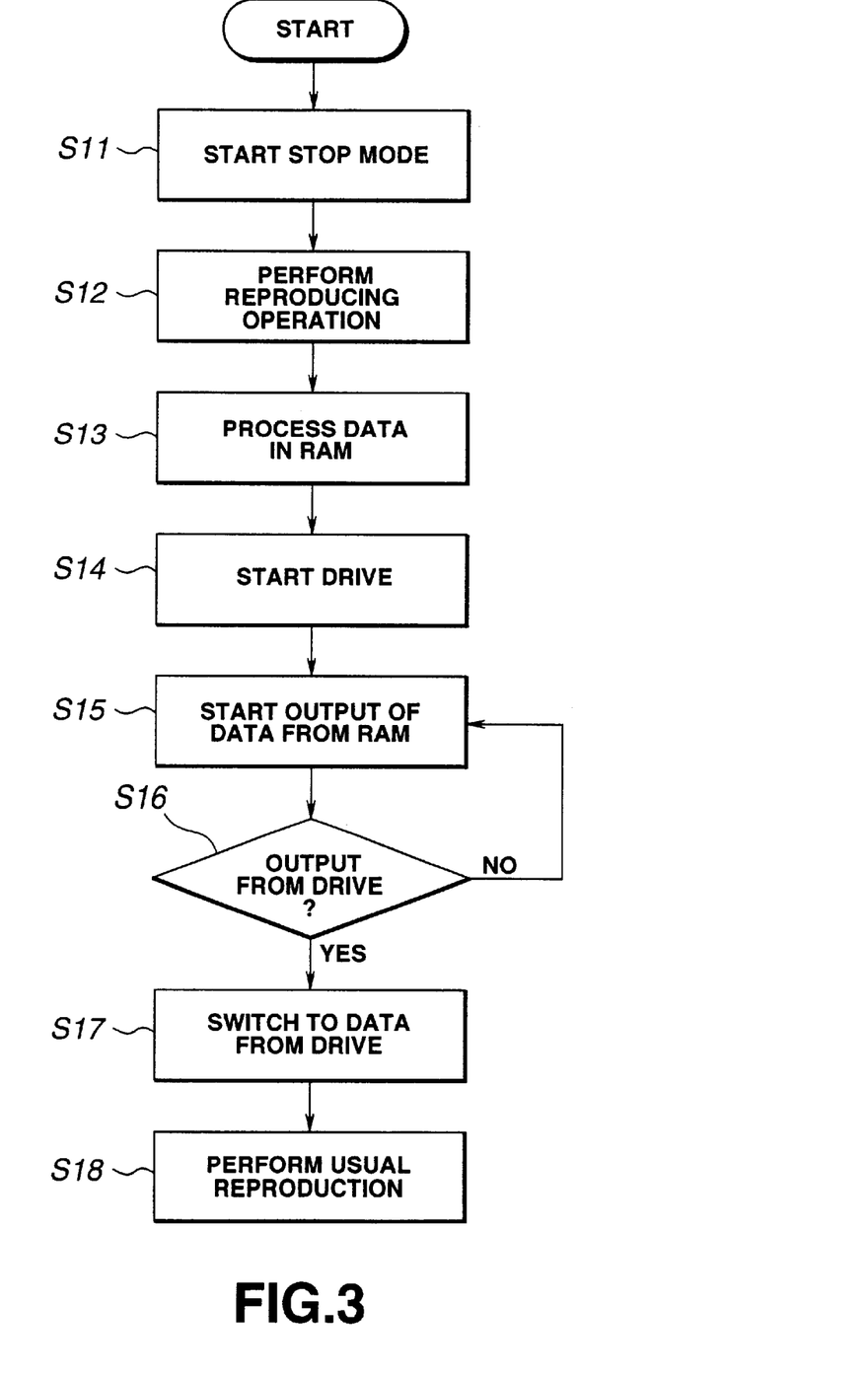
FIG. 3 is a flow chart of a process which is performed when the audio-and-video-signal reproducing apparatus has been brought to a reproducing operation start state.

The operation which must be performed when the standby state for waiting the start of the reproducing operation has been shifted to the reproducing mode will now be described. FIG. 3 is a flow chart which is performed when the state before the reproducing operation is performed has been shifted to the reproducing mode.

When an operation for starting the reproducing operation has been performed in step S12 in a state in step S11 in which data, which must be read, has previously been read and stored in the RAM 8 before the reproducing operation is started, for example, in a stop mode, the audio-and-video-signal reproducing apparatus 1 confirms data in the RAM 8 as an operation for processing data in the RAM 8 in step S13.

Specifically, whether or not data corresponding to time which takes from the operation of the drive 2 shown in FIG. 2 to a moment at which data is read from the recording medium 100 exists in the RAM 8 is determined. Actually, the foregoing information may be prepared when data has been read and stored in the RAM 8. The time required to operate the drive 2 may be determined in accordance with information previously prepared for the apparatus or may be stored as information when data has been read. The foregoing structure is effective for a compatible reproducing apparatus adaptable to various media.

Thus, existence of data is confirmed. If the quantity of data which has been written on the RAM 8 is too small, the time required to read data from the recording medium 100 is calculated. Then, timing at which an output of data which has previously been written on the RAM 8 is produced is determined. For example, the output from the RAM 8 is delayed, as necessary. As a result, output of data read from the recording medium 100 can be produced to follow data transmitted from the RAM 8 when the reproducing operation is performed.

After the audio-and-video-signal reproducing apparatus 1 has performed the above-mentioned calculations, the audio-and-video-signal reproducing apparatus 1 operates the drive 2 in step S14. In step S15 data is transmitted from the RAM 8. In step S16 whether or not the output is produced from the drive 2 is determined. If the output is not produced from the drive 2, a determination is made that the output is produced from the RAM 8 in step S15.

If a confirmation is made in step S16 that the output of data is produced from the drive 2, the audio-and-video-signal reproducing apparatus 1 continues output of data from the drive 2 in step S17. In step S18 a usual reproducing mode is started.

The audio-and-video-signal reproducing apparatus 1 performs the process in accordance with the flow chart shown in FIGS. 2 and 3. Thus, the audio-and-video-signal reproducing apparatus I is able to previously store the audio and video signal in the RAM 8 before the reproducing operation is started.

An audio-and-video-signal recording and reproducing apparatus will now be described. The audio-and-video-signal recording and reproducing apparatus is able to record an audio and video signal on a recording medium and reproduce an audio and video signal from the same. The audio-and-video-signal recording and reproducing apparatus is adapted to, for example, a disk, which is a recording medium on which an audio and video signal is recorded and from which an audio and video signal is reproduced.

Figure 4:
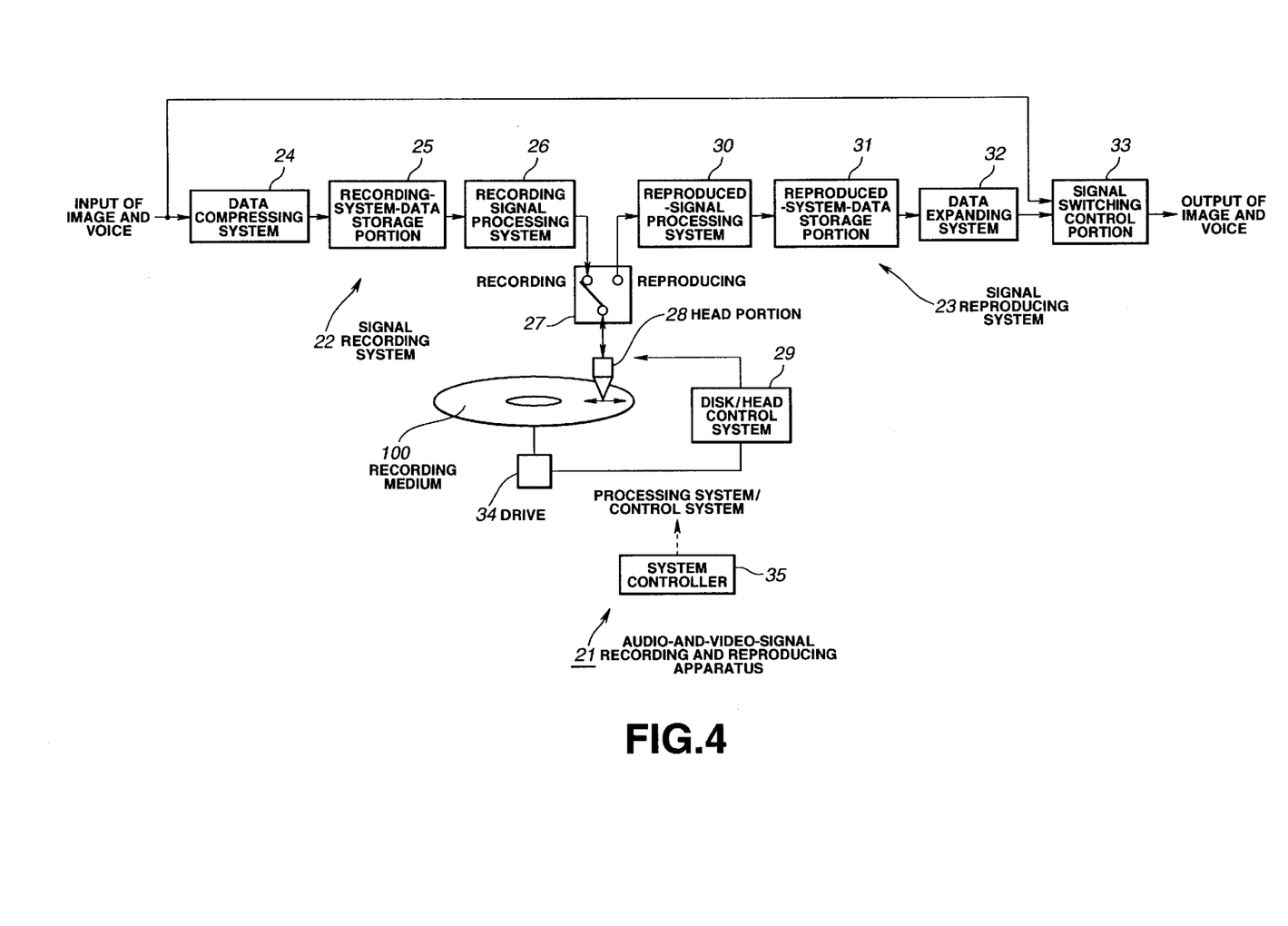
FIG. 4 is a block diagram showing circuits for use in an audio-and-video-signal recording and reproducing apparatus according to an embodiment of the present invention.

As shown in FIG. 4, the audio-and-video-signal recording and reproducing apparatus incorporates a head portion 28 having a signal writing function for writing an audio and video signal on a recording medium 100, an additional-information writing function for writing, on the recording medium 100 on which the audio and video signal is written by the signal writing function, additional information relating to the audio and video signal which is written on the recording medium 100 and a signal reading function for reading an audio and video signal recorded on the recording medium 100. Moreover, the audio-and-video-signal recording and reproducing apparatus incorporates a reproducing system-data storage portion 31 having a storage means for temporarily storing the audio and video signal read by the head portion 28; and a system controller 35 having a control function for controlling reading of the audio and video signal recorded on the recording medium 100 and writing of the audio and video signal temporarily stored in the reproducing-system-data storage portion 31.

In a state before the reproducing operation is started, the system controller 35 performs control to cause the head portion 28 to read an audio and video signal from the recording medium so as to write the audio and video signal on the reproducing-system-data storage portion 31 in accordance with additional information previously recorded on the recording medium 100.

The audio-and-video-signal reproducing apparatus 21 comprises a signal recording system 22 for processing the audio and video signal supplied to the audio-and-video-signal reproducing apparatus 21 to write the audio and video signal on the recording medium 100; and a signal reproducing system 23 for reading the audio and video signal recorded on the recording medium 100 so as to process the read audio and video signal.

The signal recording system 22 of the audio-and-video-signal reproducing apparatus 21 comprises a data compressing system 24 for compressing supplied audio and video signal; a recording-system-data storage portion 25 for temporarily storing the audio and video signal compressed by the data compressing system 24; and a recording signal processing system 26 for processing the audio and video signal transmitted from the recording-system-data storage portion 25.

The signal reproducing system 23 of the audio-and-video-signal reproducing apparatus 21 comprises a reproduced-signal processing system 30 for processing the audio and video signal read from the recording medium 100; a reproducing-system-data storage portion 31 for temporarily storing the audio and video signal processed by the reproduced-signal processing system 30; a data expanding system 32 for expanding the audio and video signal transmitted from the reproducing-system-data storage portion 31 and a signal switching control portion 33 for switching the audio and video signal transmitted from the data expanding system 32 and an audio and video signal supplied from outside so as to produce an output to an external apparatus or the like.

Moreover, the audio-and-video-signal reproducing apparatus 21 comprises a drive 34 for rotating the recording medium 100; the head portion 28 which is capable of writing the audio and video signal on the recording medium 100 and reading an audio and video signal from the same; a disk/head control portion 29 for controlling the head portion 28; and a switching portion 27 for switching the operation between an operation for transmitting the audio and video signal transmitted from the signal recording system 22 to the head portion 28 and an operation for transmitting the audio and video signal read from the recording medium 100 by the head portion 28 to transmit the audio and video signal to the signal reproducing system 23.

In the audio-and-video-signal reproducing apparatus 21, the system controller 35 controls the operations of the processing systems and the control systems.

Since the structure is arranged as described above, the audio-and-video-signal reproducing apparatus 21 is able to record, on the recording medium 100, the audio and video signal supplied to the audio-and-video-signal reproducing apparatus 21. Moreover, the audio-and-video-signal reproducing apparatus 21 is able to transmit, to the external apparatus, the audio and video signal previously recorded on the recording medium 100.

When an audio and video signal is supplied to the audio-and-video-signal reproducing apparatus 21 from outside, the audio and video signal is initially compressed by the data compressing system 24. The audio and video signal compressed by the data compressing system 24 is supplied to the recording-system-data storage portion 25.

The recording-system-data storage portion 25 is a storage means for temporarily storing supplied data, the recording-system-data storage portion 25 comprising a buffer. Data transmitted from the data compressing system 24 is stored in the recording-system-data storage portion 25.

At timing at which data is written on the recording medium 100, the recording signal processing system 26 performs a process for recording, on the recording medium 100, the audio and video signal transmitted from the recording-system-data storage portion 25. The audio and video signal processed by the recording signal processing system 26 is supplied to the head portion 28 through the switching portion 27.

The head portion 28 is a signal writing means for writing supplied data on the disk. The head portion 28 records, on the recording medium 100, the audio and video signal, additional information relating to the audio and video signal and so forth.

The disk/head control portion 29 is able to control the movement of the head portion 28 in a track direction and focusing direction. The disk/head control portion 29 controls the rotation of the drive 34 so as to rotate the recording medium 100.

As described above, the audio-and-video-signal reproducing apparatus 21 is able to record, on the recording medium 100, the audio and video signal input by the signal recording system 22.

The reproducing operation is performed by the audio-and-video-signal reproducing apparatus 21 such that an audio and video signal recorded on the recording medium 100 is read by the head portion 28 so as to be supplied to the reproduced-signal processing system 30.

The reproduced-signal processing system 30 processes the supplied signal to be a signal suitable to be reproduced. For example, the reproduced-signal processing system 30 comprises an RF amplifier, an error correction circuit and so forth. Data processed by the reproduced-signal processing system 30 is temporarily stored in the reproducing-system-data storage portion 31.

The reproducing-system-data storage portion 31 transmits data transmitted from the reproduced-signal processing system 30 to be adaptable to the process which is performed by the downstream data expanding system 32.

The data expanding system 32 expands supplied data. The audio and video signal expanded by the data expanding system 32 is supplied to the signal switching control portion 33.

The signal switching control portion 33 switches the audio and video signal transmitted from the data expanding system 32 and the audio and video signal supplied from outside. The audio and video signal selected by dint of the switching operation and transmitted as described above is supplied to, for example, a monitor. Similarly in the audio-and-video-signal reproducing apparatus 1, the audio and video signal is divided into a video signal and an audio signal so as to be processed individually. Then, the two types of the signals are transmitted.

As described above, the audio-and-video-signal reproducing apparatus 21 is able to reproduce an audio and video signal recorded on the recording medium 100.

The audio and video signal is reproduced by the audio-and-video-signal reproducing apparatus 21 such that the disk/head control portion 29 arbitrarily operates the head portion 28. Thus, a required audio and video signal recorded on the recording medium 100 is reproduced.

Similarly to the audio-and-video-signal reproducing apparatus 1, the audio-and-video-signal reproducing apparatus 21 is able to previously read an audio and video signal expected to be reproduced next so as to store the audio and video signal in the reproducing-system-data storage portion 31 when a stop state has been realized or when the recording medium 100 has been loaded.

Therefore, the audio-and-video-signal reproducing apparatus 21 is able to reproduce the audio and video signal previously stored in the reproducing-system-data storage portion 31 when data is read from the recording medium 100 because the reproducing operation has been started.

As a result, a user of the audio-and-video-signal reproducing apparatus 1 is able to immediately confirm a required audio and video signal after the user has operated the apparatus to start the reproducing operation.

When an audio and video signal is recorded, the audio-and-video-signal reproducing apparatus 21 is able to record, on the recording medium 100, also additional information of the audio and video signal which must be recorded, such as reproduction information. In accordance with reproduction information, the audio-and-video-signal reproducing apparatus 21 is able to previously store, in the reproducing-system-data storage portion 31, the audio and video signal which must be reproduced after the reproducing operation has been started.

Therefore, the audio-and-video-signal reproducing apparatus 21 is able to previously read and store the selected audio and video signal in the reproducing-system-data storage portion 31 before the reproducing operation is started in accordance with additional information recorded on the recording medium 100.

As a result, the audio-and-video-signal reproducing apparatus 21 is able to accurately select an audio and video signal which has great probability that the audio and video signal is reproduced next.

Similarly to the audio-and-video-signal reproducing apparatus 1, the audio-and-video-signal reproducing apparatus 21 is able to determine the capacity of the reproducing-system-data storage portion 31 and conditions of data which must previously be read and stored in the reproducing-system-data storage portion 31.

The signal reproducing apparatus according to the present invention comprises the storage means for temporarily storing the audio and video signal read by the signal reading means; and the control means for controlling the signal reading means to read the audio and video signal recorded on the recording medium and controlling writing of the audio and video signal which is temporarily stored in the storage means, wherein the control means causes the signal reading means to read the audio and video signal from the recording medium in a state before a reproducing operation is started so as to write the audio and video signal on the storage means. As a result, the signal reproducing apparatus previously reads the audio and video signal recorded on the recording medium before the reproducing operation is started. After the reproducing operation has been started, the audio and video signal read and stored in the storage means is transmitted.

Therefore, the signal reproducing apparatus enables required information to immediately be confirmed by a user after the user or the like has started the reproducing operation.

The signal reproducing method according to the present invention has the structure that an audio and video signal previously read from the recording medium is temporarily written on the storage means. Thus, the audio and video signal recorded on the recording medium can be read and stored in the storage means before the reproducing operation is started. After the reproducing operation has been started, the audio and video signal read and stored in the storage means can immediately be transmitted.

Thus, the signal reproducing method enables a user to immediately confirm required information after the reproducing operation has been started.

The signal recording and reproducing apparatus comprises: additional-information writing means for writing, on a recording medium on which the audio and video signal is written by signal writing means, additional information relating to the audio and video signal which is written on the recording medium; storage means for temporarily storing the audio and video signal read by signal reading means; and control means for controlling the signal reading means to read the audio and video signal recorded on the recording medium and controlling writing of the audio and video signal which is temporarily stored in the storage means, wherein the control means causes the signal reading means to previously read the audio and video signal from the recording medium and write the read audio and video signal on the storage means in accordance with additional information recorded on the recording medium in a state before a reproducing operation is started. As a result, the signal recording and reproducing apparatus previously reads the audio and video signal recorded on the recording medium to store the audio and video signal in the storage means before the reproducing operation is started in accordance with additional information recorded on the recording medium. Immediately after the reproducing operation has been started, the audio and video signal read and stored in the storage means is transmitted.

Therefore, the signal reproducing apparatus enables a user to immediately confirm required information after the reproducing operation has been started.

The signal recording and reproducing method of recording an audio and video signal on a recording medium and reproducing an audio and video signal from the same, the signal recording and reproducing method comprising: an additional-information writing step for writing, on the recording medium on which the audio and video signal is written, additional information relating to the audio and video signal which is written on the recording medium; and a storage step for temporarily storing, in storage means, the audio and video signal previously read from the recording medium in a state before a reproducing operation is started in accordance with additional information written on the recording medium in the writing step. As a result, the signal recording and reproducing method has the structure that the audio and video signal recorded on the recording medium is previously read and stored in the storage means before the reproducing operation is started in accordance with additional information recorded on the recording medium. Immediately after the reproducing operation has been started, the audio and video signal read and stored in the storage means is transmitted.

Therefore, the signal recording and reproducing method according to the present invention enables a user to immediately confirm required information after the reproducing operation has been started.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A signal reproducing apparatus comprising:
    signal reading means for reading an audio and video signal recorded on a recording medium;
    storage means for temporarily storing the audio and video signal read by said signal reading means; and
    control means for controlling said signal reading means to read the audio and video signal recorded on said recording medium and controlling writing of the audio and video signal which is temporarily stored in said storage means; wherein,
    said control means causes said signal reading means to read the audio and video signal from the recording medium in a non-reproduction state of said reproducing apparatus, and to write the audio and video signal thereby read on the storage means to reduce or eliminate delay in reproducing said audio and video signal when a reproduction mode is started; and
    during said non-reproduction state, said signal reading means reads an amount of data from each of a plurality of reproducing points on said recording medium, with priority given to: a reproducing point at the leading edge of the recording medium; a reproducing point following a reproducing point previously reproduced; a reproducing point which has not been reproduced; a reproducing point recorded last on the recording medium; and a reproducing point on the boundary of recorded contents.

2. A signal reproducing apparatus according to claim 1, wherein a storage capacity of said storage means is not smaller than a quantity of data which is transmitted from said storage means in a period of time from the operation for starting the reproducing operation to reading of the audio and video signal from said recording medium.

3. A signal reproducing apparatus according to claim 1, wherein said control means pre-writes an audio and video signal expected to be reproduced next on said storage means before the reproducing operation is started.

4. A signal reproducing apparatus according to claim 1, wherein when said recording medium has been loaded, said control means pre-writes, on said storage means, an audio and video signal recorded at a leading end of said loaded recording medium before the reproducing operation is started.

5. A signal reproducing apparatus according to claim 1, wherein when the audio and video signal has been reproduced and the reproducing operation is interrupted, said control means writes, on said storage means, the audio and video signal following said audio and video signal reproduced to the point of interruption.

6. A signal reproducing apparatus according to claim 1, wherein said control means pre-writes, on said storage means, a plurality of audio and video signals expected to be reproduced next before the reproducing operation is started in accordance with additional information recorded on said recording medium.

7. A signal reproducing apparatus according to claim 1, wherein said control means determines a plurality of audio and video signals which must be read from said recording medium so as to be stored in said storage means in accordance with a quantity of signals which must be written on said storage means.

8. A signal reproducing apparatus according to claim 1, wherein said control means pre-writes an audio and video signal previously read from said recording medium on storage means provided for another purpose before the reproducing operation is started.

9. A signal recording and reproducing apparatus comprising:

signal writing means for writing an audio and video signal on a recording medium;

additional-information writing means for writing, on a recording medium on which the audio and video signal is written by said signal writing means, additional information relating to the audio and video signal which is written on said recording medium;

signal reading means for reading the audio and video signal recorded on said recording medium;

storage means for temporarily storing the audio and video signal read by said signal reading means; and control means for controlling said signal reading means to read the audio and video signal recorded on said recording medium and controlling writing of the audio and video signal which is temporarily stored in said storage means; wherein, said control means causes said signal reading means to read the audio and video signal from said recording medium and write the read audio and video signal on said storage means in accordance with additional information recorded on said recording medium in a non-reproduction state of said apparatus to reduce or eliminate delay in reproducing said audio and video signal when a reproduction mode is started; and during said non-reproduction state, said signal reading means reads an amount of data from each of a plurality of reproducing points on said recording medium, with priority given to: a reproducing point at the leading edge of the recording medium; a reproducing point following a reproducing point previously reproduced; a reproducing point which has not been reproduced; a reproducing point recorded last on the recording medium; and a reproducing point on the boundary of recorded contents.

10. A signal recording and reproducing apparatus according to claim 9, wherein said additional information includes information about a reproduction start position and reproduction information of the audio and video signal which is recorded on said recording medium by said signal writing means, and said control means pre-writes, on said storage means, an audio and video signal which will be reproduced next in accordance with information about the reproduction start position and reproduction information recorded on said recording medium.

11. A signal recording and reproducing method, performed in a signal recording and reproducing apparatus, for recording an audio and video signal on a recording medium and reproducing an audio and video signal from said recording medium, said signal recording and reproducing method comprising:

writing, on the recording medium on which the audio and video signal is written, additional information relating to the audio and video signal which is written on said recording medium; and temporarily storing, in storage means, a portion of the audio and video signal pre-read from said recording medium in a non-reproduction state of said apparatus in accordance with additional information written on said recording medium, to reduce or eliminate delay in reproducing said audio and video signal when a reproduction mode is started;

wherein said portion of the audio and video signal pre-read from said recording medium in the non-reproduction state comprises data read from each of a plurality of reproducing points on said recording medium, with priority given to: a reproducing point at the leading edge of the recording medium; a reproducing point following a reproducing point previously reproduced; a reproducing point which has not been reproduced; a reproducing point recorded last on the recording medium; and a reproducing point on the boundary of recorded contents.

12. A signal reproducing apparatus comprising:

a signal reading portion for reading an audio and video signal recorded on a recording medium;

a memory for temporarily storing the audio and video signal read by said signal reading portion; and a controller for controlling said signal reading portion to read tie audio and video signal recorded on said recording medium and controlling writing of the audio and video signal which is temporarily stored in said memory;

wherein said controller causes said signal reading portion to read the audio and video signal from the recording medium in a non-reproduction mode of the reproducing apparatus, to reduce or eliminate delay in reproducing said audio and video signal when a reproduction mode is started; and during said non-reproduction mode, said signal reading portion reads an amount of data from each of a plurality of reproducing points on said recording medium, with priority given to: a reproducing point at the leading edge of the recording medium; a reproducing point following a reproducing point previously reproduced; a reproducing point which has not been reproduced; a reproducing point recorded last on the recording medium; and a reproducing point on the boundary of recorded contents.

13. The signal reproducing apparatus of claim 12 wherein said non-reproduction mode is a stop state of said reproducing apparatus.

14. A signal reproducing method performed in a reproducing apparatus, comprising the step of pre-writing an audio and video signal read from a recording medium on a storage means in a stop state of said reproducing apparatus, wherein the pre-written audio and video signal comprises data read from each of a plurality of reproducing points on said recording medium, with priority given to: a reproducing point at the leading edge of the recording medium; a reproducing point following a reproducing point previously reproduced; a reproducing point which has not been reproduced; a reproducing point recorded last on the recording medium; and a reproducing point on the boundary of recorded contents.

15. A signal reproducing method comprising the steps of:

pre-writing an audio and video signal read from a recording medium on a storage means in a state before a user initiates a reproducing operation; and immediately reading and reproducing the audio and video signal from the storage means when a user initiates a reproduction operation, whereby reproduction delay that would otherwise occur at the beginning of the user-initiated reproduction operation is reduced or eliminated;

wherein said pre-written audio and video signal read from said recording medium in the non-reproduction state comprises data read from each of a plurality of reproducing points on said recording medium, with priority given to: a reproducing point at the leading edge of the recording medium; a reproducing point following a reproducing point previously reproduced; a reproducing point which has not been reproduced; a reproducing point recorded last on the recording medium; and a reproducing point on the boundary of recorded contents.

* * * * *